(12) United States Patent
Yerramalli et al.

(10) Patent No.: US 11,297,613 B2
(45) Date of Patent: Apr. 5, 2022

(54) BEAM DEFINITION FOR DIRECTIONAL COMMUNICATIONS

(71) Applicant: QUALCOMM incorporated, San Diego, CA (US)

(72) Inventors: Srinivas Yerramalli, San Diego, CA (US); Xiaoxia Zhang, San Diego, CA (US); Tao Luo, San Diego, CA (US); Arumugam Chendamarai Kannan, San Diego, CA (US); Vinay Chande, San Diego, CA (US); Makesh Pravin John Wilson, San Diego, CA (US); Sungwoo Park, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/746,304

(22) Filed: Jan. 17, 2020

(65) Prior Publication Data

US 2020/0252923 A1 Aug. 6, 2020

Related U.S. Application Data

(60) Provisional application No. 62/799,722, filed on Jan. 31, 2019.

(51) Int. Cl.
*H04W 72/04* (2009.01)
*H04W 74/08* (2009.01)
(Continued)

(52) U.S. Cl.
CPC ........ *H04W 72/044* (2013.01); *H04B 7/0695* (2013.01); *H04B 7/088* (2013.01);
(Continued)

(58) Field of Classification Search
CPC .......... H04W 72/044; H04W 74/0808; H04W 72/048; H04W 48/08; H04W 16/14; H04B 7/088; H04B 7/0695
See application file for complete search history.

(56) References Cited

U.S. PATENT DOCUMENTS

| 2013/0170480 A1* | 7/2013 | Novak | H04L 1/1893 370/337 |
| 2016/0037560 A1* | 2/2016 | Liu | H04W 74/0808 370/329 |

(Continued)

FOREIGN PATENT DOCUMENTS

| WO | WO-2017020293 A1 | 2/2017 |
| WO | WO-2018059512 A1 | 4/2018 |

(Continued)

OTHER PUBLICATIONS

CATT, "Discussion on QCL for NR", May 2017, 3GPP TSG RAN WG1 Meeting #89, R1-1708888, 4 Pages (Year: 2017).*
(Continued)

*Primary Examiner* — Ivan O Latorre
(74) *Attorney, Agent, or Firm* — Holland & Hart LLP

(57) ABSTRACT

Methods, systems, and devices for wireless communication are described. Generally, the described techniques provide for efficiently identifying a receive beam for performing a listen before talk (LBT) procedure in an attempt to gain access to a transmission opportunity (TxOP) in a shared radio frequency spectrum. In particular, a wireless device may select a receive beam that corresponds to one or more transmit beams to be used in a TxOP to perform an LBT procedure in an attempt to gain access to the TxOP. In one example, the wireless device may select a receive beam for performing an LBT procedure based on the energy of each of the transmit beams to be used in a TxOP. In another example, the wireless device may select a receive beam for (Continued)

performing an LBT procedure if the receive beam is quasi co-located with each of the transmit beams to be used in a TxOP.

29 Claims, 12 Drawing Sheets

(51) Int. Cl.
  *H04B 7/08* (2006.01)
  *H04B 7/06* (2006.01)
  *H04W 48/08* (2009.01)
(52) U.S. Cl.
  CPC ......... *H04W 48/08* (2013.01); *H04W 72/048* (2013.01); *H04W 74/0808* (2013.01)

(56) References Cited

U.S. PATENT DOCUMENTS

| 2016/0050684 | A1* | 2/2016 | Ni | H04W 72/1205 370/329 |
| 2017/0048047 | A1* | 2/2017 | Kadous | H04L 1/1854 |
| 2017/0048889 | A1* | 2/2017 | Kadous | H04W 72/0446 |
| 2017/0118774 | A1* | 4/2017 | Cariou | H04W 74/0816 |
| 2017/0303136 | A1* | 10/2017 | Park | H04B 17/102 |
| 2018/0115996 | A1* | 4/2018 | Si | H04W 74/0808 |
| 2018/0184457 | A1* | 6/2018 | Islam | H04W 72/082 |
| 2018/0331860 | A1* | 11/2018 | Bergman | H04L 5/0048 |
| 2018/0352577 | A1* | 12/2018 | Zhang | H04W 16/14 |
| 2018/0376429 | A1* | 12/2018 | Islam | H04W 52/242 |
| 2019/0191460 | A1* | 6/2019 | Chendamarai Kannan | H04B 7/0695 |
| 2019/0200389 | A1* | 6/2019 | Li | H04W 72/1231 |
| 2019/0230706 | A1* | 7/2019 | Li | H04W 88/08 |
| 2019/0239094 | A1* | 8/2019 | Do | H04W 74/0808 |
| 2019/0373635 | A1* | 12/2019 | Yang | H04B 7/0408 |
| 2020/0145079 | A1* | 5/2020 | Marinier | H04B 7/0456 |
| 2020/0154474 | A1* | 5/2020 | Lo | H04W 74/0808 |
| 2020/0221441 | A1* | 7/2020 | Chen | H04B 7/0617 |
| 2020/0280859 | A1* | 9/2020 | Kim | H04W 72/042 |
| 2020/0322982 | A1* | 10/2020 | Wu | H04W 74/006 |
| 2020/0366337 | A1* | 11/2020 | Xie | H04W 74/08 |
| 2020/0413268 | A1* | 12/2020 | Yerramalli | H04B 17/102 |
| 2021/0022015 | A1* | 1/2021 | Oh | H04W 56/001 |
| 2021/0045154 | A1* | 2/2021 | Ahn | H04W 16/28 |
| 2021/0058967 | A1* | 2/2021 | Oteri | H04W 74/0808 |

FOREIGN PATENT DOCUMENTS

| WO | WO-2018062966 A1 | 4/2018 |
| WO | WO-2019099530 A1 | 5/2019 |

OTHER PUBLICATIONS

International Search Report and Written Opinion—PCT/US2020/014477—ISA/EPO—May 13, 2020.

* cited by examiner

BEAM DEFINITION FOR DIRECTIONAL COMMUNICATIONS

CROSS REFERENCE

The present application for patent claims the benefit of U.S. Provisional Patent Application No. 62/799,722 by YERRAMALLI et al., entitled "BEAM DEFINITION FOR DIRECTIONAL COMMUNICATIONS," filed Jan. 31, 2019, assigned to the assignee hereof, and expressly incorporated herein.

BACKGROUND

The following relates generally to wireless communications and more specifically to beam definition for directional communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). Some wireless communications systems (e.g., high frequency systems) may support communications between a base station and a UE using one or more beams. In some cases, it may be appropriate for a wireless device (e.g., base station or UE) to transmit or receive signals (e.g., reference signals, control signals, or data signals) using one or more beams in a shared radio frequency spectrum. The shared radio frequency spectrum may be a spectrum that is unlicensed, licensed to multiple operators, or licensed to a single operator. Conventional techniques for supporting communications using beams in a shared radio frequency spectrum may be deficient.

SUMMARY

The described techniques relate to improved methods, systems, devices, and apparatuses that support beam definition for directional communications. Generally, the described techniques provide for efficiently identifying a receive beam for performing a listen before talk (LBT) procedure in an attempt to gain access to a transmission opportunity (TxOP) in a shared radio frequency spectrum. In particular, a wireless device may select a receive beam that corresponds to (e.g., contains or covers) one or more transmit beams to be used in a TxOP to perform an LBT procedure in an attempt to gain access to the TxOP. In some examples, the wireless device may select a receive beam for performing an LBT procedure based on the energy of each of the transmit beams to be used in a TxOP. In other examples, the wireless device may select a receive beam for performing an LBT procedure if the receive beam is quasi co-located with each of the transmit beams to be used in a TxOP.

A method for wireless communication is described. The method may include identifying one or more transmit beams to be used for transmissions in a transmission opportunity of a shared radio frequency spectrum, selecting a receive beam corresponding to the one or more transmit beams for performing a listen before talk procedure in an attempt to gain access to the transmission opportunity for the transmissions, and performing the listen before talk procedure using the selected receive beam.

An apparatus for wireless communication is described. The apparatus may include a processor, memory in electronic communication with the processor, and instructions stored in the memory. The instructions may be executable by the processor to cause the apparatus to identify one or more transmit beams to be used for transmissions in a transmission opportunity of a shared radio frequency spectrum, select a receive beam corresponding to the one or more transmit beams for performing a listen before talk procedure in an attempt to gain access to the transmission opportunity for the transmissions, and perform the listen before talk procedure using the selected receive beam.

Another apparatus for wireless communication is described. The apparatus may include means for identifying one or more transmit beams to be used for transmissions in a transmission opportunity of a shared radio frequency spectrum, selecting a receive beam corresponding to the one or more transmit beams for performing a listen before talk procedure in an attempt to gain access to the transmission opportunity for the transmissions, and performing the listen before talk procedure using the selected receive beam.

A non-transitory computer-readable medium storing code for wireless communication is described. The code may include instructions executable by a processor to identify one or more transmit beams to be used for transmissions in a transmission opportunity of a shared radio frequency spectrum, select a receive beam corresponding to the one or more transmit beams for performing a listen before talk procedure in an attempt to gain access to the transmission opportunity for the transmissions, and perform the listen before talk procedure using the selected receive beam.

Some examples of the method, apparatuses, and non-transitory computer-readable medium described herein may further include operations, features, means, or instructions for determining that the receive beam is a widest beam corresponding to the one or more transmit beams, where selecting the receive beam is based at least in part on the receive beam being the widest beam corresponding to the one or more transmit beams.

Some examples of the method, apparatuses, and non-transitory computer-readable medium described herein may further include operations, features, means, or instructions for determining an energy of each of the one or more transmit beams, where selecting the receive beam may be based on the energy of each of the one or more transmit beams. Some examples of the method, apparatuses, and non-transitory computer-readable medium described herein may further include operations, features, means, or instructions for determining a maximum gain for receiving a transmission on each of the one or more transmit beams, identifying subsets of receive beams each corresponding to one of the one or more transmit beams, where the subset of receive beams corresponding to a transmit beam includes receive beams each having a gain that may be within a threshold of the maximum gain for receiving a transmission on the transmit beam, and identifying a set of receive beams available for performing the listen before talk procedure as a union of the subsets of receive beams. In some examples of the method, apparatuses, and non-transitory computer-readable medium described herein, the threshold includes an attenuation factor.

In some examples of the method, apparatuses, and non-transitory computer-readable medium described herein, selecting the receive beam may include operations, features, means, or instructions for determining that the energy of each of the one or more transmit beams integrated over the angle of the receive beam may be greater than a fraction of a total energy of each of the one or more transmit beams integrated over all directions, and selecting the receive beam from the set of receive beams based on the determination. In some examples of the method, apparatuses, and non-transitory computer-readable medium described herein, the fraction of the total energy may be calculated by multiplying a threshold value by the total energy of each of the one or more transmit beams integrated over all directions.

In some examples of the method, apparatuses, and non-transitory computer-readable medium described herein, selecting the receive beam may include operations, features, means, or instructions for determining that the receive beam may be quasi co-located with each of the one or more transmit beams, and selecting the receive beam for performing the listen before talk procedure based on the determining. In some examples of the method, apparatuses, and non-transitory computer-readable medium described herein, determining that the receive beam may be quasi co-located with each of the one or more transmit beams may include operations, features, means, or instructions for identifying a target quasi-co-location (QCL) type, and determining that a relationship between the receive beam and each of the one or more transmit beams may be in accordance with the target QCL type.

In some examples of the method, apparatuses, and non-transitory computer-readable medium described herein, identifying the one or more transmit beams to be used for transmissions in the transmission opportunity may include operations, features, means, or instructions for identifying the one or more transmit beams to be used for at least a fraction of transmissions in the transmission opportunity of the shared radio frequency spectrum. In some examples of the method, apparatuses, and non-transitory computer-readable medium described herein, the at least fraction of the transmissions in the transmission opportunity corresponds to at least a fraction of a number of symbols in the transmission opportunity.

Some examples of the method, apparatuses, and non-transitory computer-readable medium described herein may further include operations, features, means, or instructions for refraining from performing a listen before talk procedure for transmissions in a remainder of the transmission opportunity or performing a one-shot listen before talk procedure for transmissions in the remainder of the transmission opportunity. In some examples of the method, apparatuses, and non-transitory computer-readable medium described herein, the transmissions include reference signal transmissions, control information transmissions, data transmissions, or a combination thereof.

DETAILED DESCRIPTION

Figure 1:
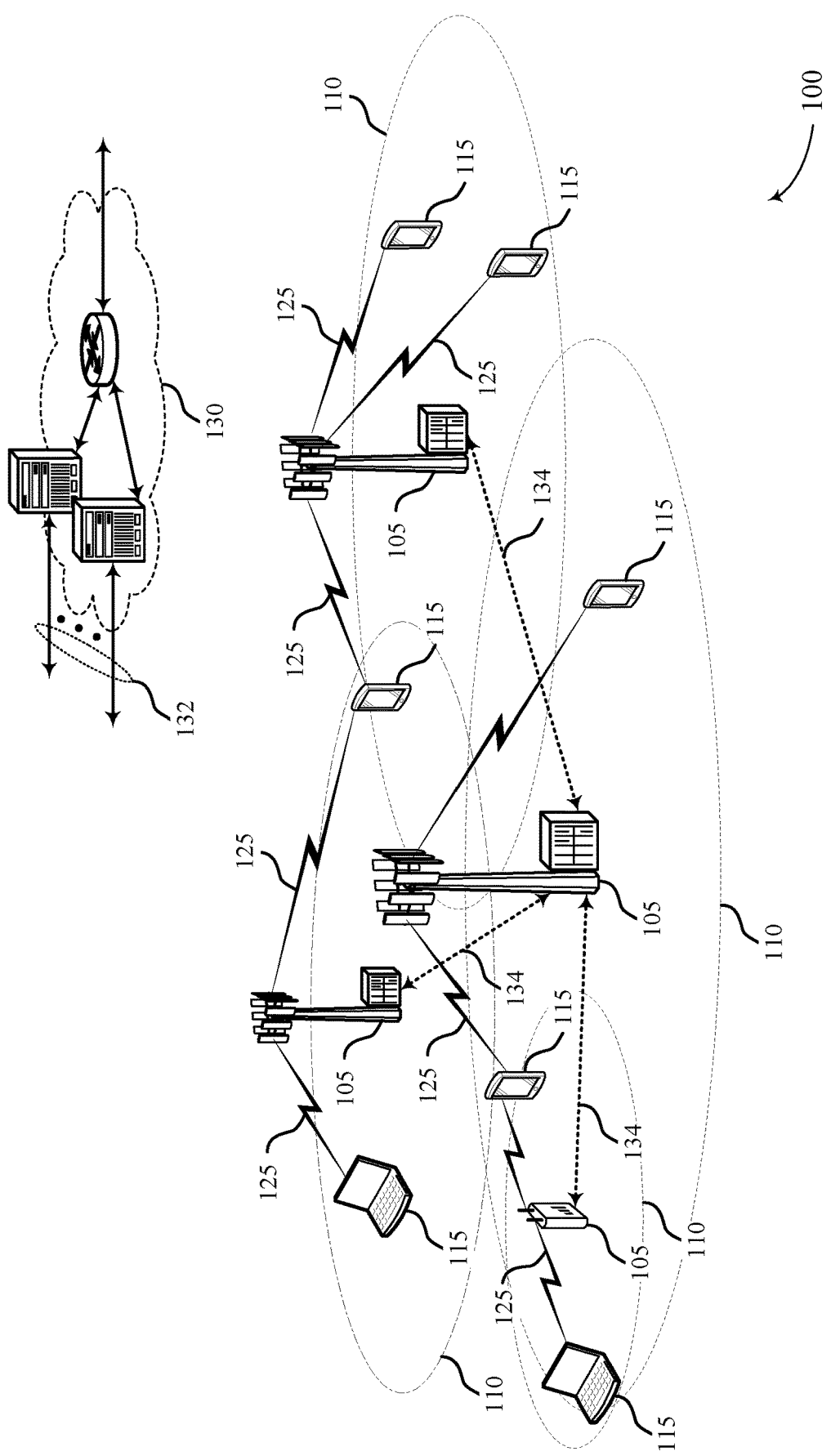
FIG. 1 illustrates an example of a wireless communications system that supports beam definition for directional communications in accordance with aspects of the present disclosure.

In some wireless communications systems, wireless devices (e.g., base stations and user equipment (UEs)) may communicate using one or more beams in a shared radio frequency spectrum. In such systems, a wireless device may be scheduled to use multiple beams for transmitting in a transmission opportunity (TxOP) of the shared radio frequency spectrum. Accordingly, it may be appropriate for the wireless device to gain access to the shared radio frequency spectrum before transmitting in the shared radio frequency spectrum. For instance, it may be appropriate for the wireless device to perform a listen before talk (LBT) procedure on the shared spectrum to detect if the shared spectrum is clear before transmitting in a TxOP (e.g., to prevent interference and packet loss).

In some aspects, the wireless device may use an omni-directional receive beam (e.g., a receive beam with a pseudo-omni beam pattern) for performing the LBT procedure to ensure the shared spectrum is clear for transmissions in all directions. In such aspects, however, though the transmit beams used by a wireless device for transmitting in a shared spectrum may not overlap (e.g., overlap substantially) with transmit beams being used by other wireless devices in the shared spectrum, an LBT procedure using an omni-directional receive beam may still fail since the transmit beams used by the other wireless devices may overlap (e.g., overlap substantially) with the omni-directional receive beam used for the LBT procedure (e.g., resulting in large delays and even deadlock situations).

As described herein, wireless devices may support efficient techniques for identifying a receive beam for performing an LBT procedure in an attempt to gain access to a TxOP for transmissions using one or more transmit beams in a shared radio frequency spectrum. In particular, a wireless device may select a receive beam that corresponds to (e.g., contains or covers) one or more transmit beams to be used in a TxOP to perform an LBT procedure in an attempt to gain access to the TxOP. For example, the wireless device may select a receive beam for performing an LBT procedure (e.g., determine that the receive beam corresponds to the one or more transmit beams) based on the energy of each of the transmit beams to be used in a TxOP. In other examples, the wireless device may select a receive beam (e.g., determine that the receive beam corresponds to the one or more transmit beams) for performing an LBT procedure if the receive beam is quasi co-located with each of the transmit beams to be used in a TxOP.

Aspects of the disclosure introduced above are described below in the context of a wireless communications system. Examples of processes and signaling exchanges that support beam definition for directional communications are then described. Aspects of the disclosure are further illustrated by and described with reference to apparatus diagrams, system diagrams, and flowcharts that relate to beam definition for directional communications.

FIG. 1 illustrates an example of a wireless communications system 100 that supports beam definition for directional communications in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105 (e.g., physical uplink shared channel (PUSCH) or physical uplink control channel (PUCCH) transmissions) or downlink transmissions from a base station 105 to a UE 115 (e.g., physical downlink shared channel (PDSCH) or physical downlink control channel (PDCCH) transmissions). Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

The term "carrier" may refer to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users. Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both unshared (e.g., licensed) and shared (e.g., unlicensed) radio frequency spectrum bands. For example, wireless communications system 100 may employ License Assisted Access (LAA), LTE-Unlicensed (LTE-U) radio access technology, or NR technology in an unlicensed band such as sub-6 GHz NR-U, FR3 NR-U (e.g., 7 GHz to 24 GHz), and FR4 NR-U (e.g., 52 GHz and above). When operating in shared radio frequency spectrum bands, wireless devices such as base stations 105 and UEs 115 may employ LBT procedures to ensure a frequency channel is clear before transmitting data. There may be different categories of LBT procedures, including category 1 LBT (i.e., no LBT), category 2 LBT (i.e., LBT without a random back-off), category 3 LBT (i.e., LBT with a random back-off and a fixed sized contention window), and category 4 LBT (i.e., LBT with a random back-off and a variable sized contention window). In some cases, operations in shared bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing.

The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In wireless communications system 100, a first beam may be said to be quasi co-located with a second beam if the properties (e.g., Doppler shift, Doppler spread, average delay, delay spread, or spatial receive parameters) of a transmission on the first beam may be inferred from the properties of a transmission on the second beam. Thus, if a relationship between a first beam and a second beam is in accordance with a quasi co-location (QCL) type, a wireless device may be able to determine the properties of a transmission on the second beam from the properties of a transmission on the first beam in accordance with the QCL type. A first QCL type (e.g., QCL type A) may indicate that two beams share the same Doppler shift, Doppler spread, average delay, and delay spread, a second QCL type (e.g., QCL type B) may indicate that two beams share the same Doppler shift and Doppler spread, a third QCL type (e.g., QCL type C) may indicate that two beams share the same average delay and doppler shift, and a fourth QCL type (e.g., QCL type D) may indicate that two beams share the same spatial receive parameters.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

As described above, in some wireless communications systems (e.g., sub-6 GHz systems), wireless devices (e.g., base stations and user equipment (UEs)) may communicate in a shared radio frequency spectrum. In such systems, it may be appropriate for a wireless device to gain access to a TxOP in the shared radio frequency spectrum before transmitting in the shared radio frequency spectrum (e.g., to prevent interference and packet loss). For example, it may be appropriate for a wireless device to perform an LBT procedure to check if a shared radio frequency spectrum is clear for transmitting (e.g., using energy detection) before the wireless device transmits in the shared radio frequency spectrum. Accordingly, the wireless device may perform the LBT procedure (e.g., a short 25 μs category 4 LBT procedure) in an omni-direction to determine whether the shared radio frequency spectrum is clear in all directions prior to transmitting in the shared radio frequency spectrum (e.g., such that the wireless device may obtain the right to transmit in any direction to one or more UEs 115).

In other systems (e.g., high frequency systems such as FR3 or FR4 NR-U systems) wireless devices may communicate in a shared radio frequency spectrum using beams. In such systems, a wireless device may be configured to use multiple transmit beams for transmitting in a TxOP of the shared radio frequency spectrum (e.g., different transmit beams for TDM transmissions with frequent switching between the beams in the TxOP). Thus, it may be challenging for the wireless device to identify an appropriate receive beam for performing an LBT procedure to check if the shared radio frequency spectrum is clear for transmitting using the multiple transmit beams.

Figure 2:
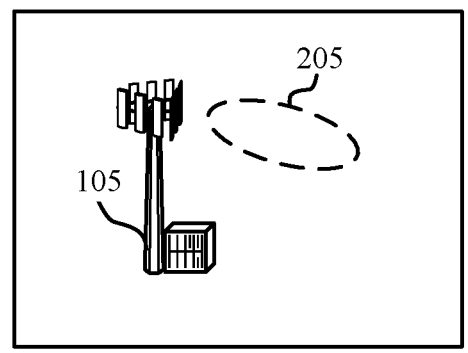
FIG. 2 illustrates an example of a receive beam used to perform a listen before talk (LBT) procedure in an attempt to gain access to a transmission opportunity (TxOP) and an example of transmit beams to be used for transmissions in the TxOP in accordance with aspects of the present disclosure.
Figure 2:
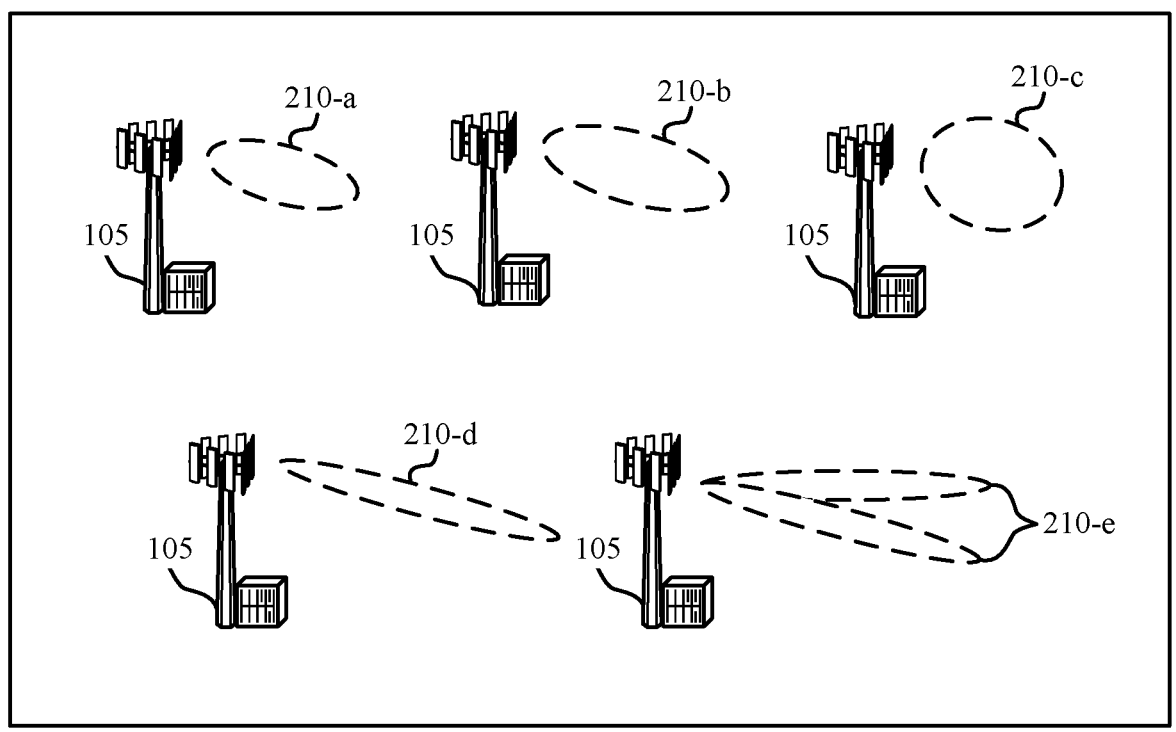

FIG. 2 illustrates an example 200-a of a receive beam 205 used to perform an LBT procedure in an attempt to gain access to a TxOP and an example 200-b of transmit beams 210 to be used for transmissions in the TxOP in accordance with aspects of the present disclosure. In the example of FIG. 2, the receive beam 205 may correspond to (e.g., contain or cover) transmit beam 210-a used for a transmission in the TxOP. However, the base station 105 may be scheduled to use other transmit beams 210 for transmissions in the TxOP (e.g., a similar transmit beam 210-b, a wider transmit beam 210-c, a narrower transmit beam 210-d, or multiple narrow transmit beams 210-e within a wider beam). Thus, if the base station 105 performs the LBT procedure using the receive beam 205, the transmissions by the base station 105 in the TxOP using transmit beams 210-b to 210-e may interfere with other transmissions in the shared radio frequency spectrum (e.g., since the base station 105 failed to check if the channel was clear for transmitting using the other transmit beams 210-b to 210-e).

Thus, in other examples, to ensure a shared radio frequency spectrum is clear for transmitting using all transmit beams 210-a to 210-e, the base station 105 may use an omni-directional receive beam for performing an LBT procedure. In such examples, however, the use of an omni-directional receive beam (e.g., a receive beam with a pseudo-omni beam pattern) for performing the LBT procedure may result in large delays. For example, a wireless device may not be able to gain access to the shared radio frequency spectrum for a long time or potentially a deadlock scenario where the wireless device may not be able to gain access to the shared radio frequency spectrum. For instance, though the transmit beams 210 to be used by the wireless device for transmitting in the shared spectrum may not overlap (e.g., overlap substantially) with transmit beams being used by other wireless devices in the shared spectrum, an LBT procedure performed using an omni-directional receive beam may fail since the transmit beams being used by the other wireless devices may overlap (e.g., overlap substantially) with the omni-directional receive beam used for the LBT procedure.

To prevent the LBT procedure from failing, wireless communications system 100 may support efficient techniques for a wireless device identifying a receive beam for performing an LBT procedure in an attempt to gain access to a TxOP for transmissions using one or more transmit beams in a shared radio frequency spectrum. In particular, a wireless device in wireless communications system 100 may select a receive beam that corresponds to (e.g., contains or covers) one or more transmit beams to be used in a TxOP to perform an LBT procedure in an attempt to gain access to the TxOP. The techniques described herein for selecting a receive beam for performing an LBT procedure, which may include determining whether the receive beam corresponds to—e.g., contains or covers, at least to a sufficient degree—the one or more transmit beams, may be performed by a base station, a UE, or any wireless device attempting to gain access to a shared radio frequency spectrum. Further, the techniques for identifying a receive beam may also be used for performing other procedures (i.e., other than LBT).

Figure 3:
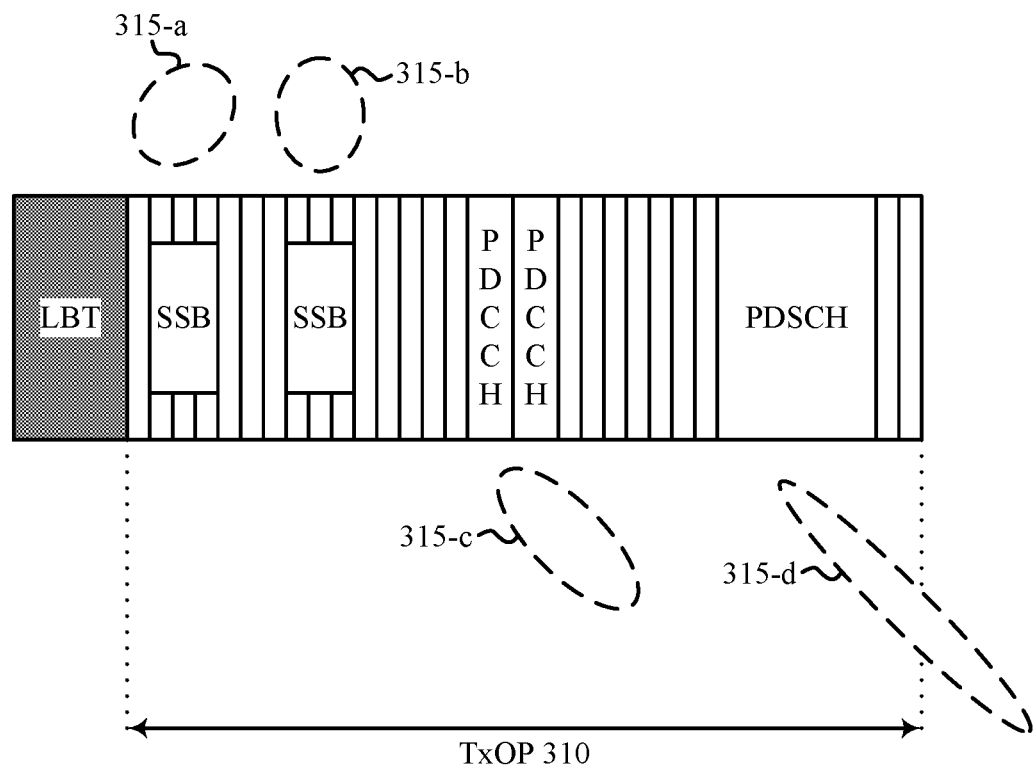
FIGS. 3 and 4 illustrate examples of timelines of communications in a shared radio frequency spectrum in accordance with aspects of the present disclosure.

FIG. 3 illustrates an example of a timeline 300 of communications in a shared radio frequency spectrum in accordance with aspects of the present disclosure. In the example of FIG. 3, a base station 105 may be scheduled to transmit using multiple beams (e.g., using the same panel or different panels) in the shared radio frequency spectrum. For instance, the base station 105 may be scheduled to transmit a first synchronization signal block (SSB) using a first transmit beam 315-a (e.g., a wide beam), a second SSB using a second transmit beam 315-b (e.g., a wide beam), control information (e.g., common or UE-specific) in a PDCCH using a third transmit beam 315-c (e.g., narrow beams), data in a PDSCH using a fourth transmit beam 315-d (e.g., very narrow beams), and channel state information reference signals (CSI-RSs) for new beam candidates (not shown). Accordingly, the base station 105 may perform an LBT procedure 305 to gain access to the TxOP 310 for the transmissions using transmit beams 315 in the shared radio frequency spectrum. As described herein, the base station 105 may select a suitable receive beam for performing the LBT procedure such that the receive beam corresponds to (e.g., contains or covers) the transmit beams 315 (e.g., without being omni-directional or covering unnecessary directional transmissions).

In one example, the base station 105 may select a receive beam for performing an LBT procedure based on the energy of each of the transmit beams 315 to be used for transmissions in the TxOP 310. For example, the receive beam may be a wide (e.g., widest) beam (i.e., beam with a broad (e.g., broadest) angular spread) that corresponds to (e.g., contains, or covers) the transmit beams 315. In this example, the base station 105 may first identify a set of receive beams corresponding to all of the transmit beams 315 by combining subsets of receive beams corresponding to each transmit beam 315. To identify the subset of receive beams corresponding to a transmit beam ($X(\theta, \phi)$), the base station 105 may identify the transmit beam pattern ($A_t(\theta, \phi)$) of the transmit beam, and the base station 105 may identify a receive beam pattern ($A_r(\theta, \phi)$) corresponding to the transmit beam pattern (e.g., a receive beam pattern may be at the same angles ($\theta$ and $\phi$) of the transmit beam pattern). The base station 105 may then identify the point of peak gain based on the receive beam ($A_{r,max}$=max $A_r(\theta, \phi)$), and the base station 105 may check the gain of each of a number of receive beams against the peak gain to identify the subset of receive beams for that transmit beam.

If the gain of a receive beam is within a threshold ($\alpha$) of the peak gain for receiving a transmission on a transmit beam (i.e., if the following equation is satisfied: $A_r(\theta, \phi) \geq \alpha A_{r,max}$, where $\alpha < 1$), the base station 105 may determine that the receive beam is a suitable receive beam for performing LBT for transmissions using the transmit beam. In some cases, a may be a member of the set $\{-3, -5, -6, -9, -10\}$ (i.e., $\alpha \in \{-3, -5, -6, -9, -10\}$ dB), and a smaller $\alpha$ value may result in more receive beams being supported for performing an LBT procedure for transmissions using a transmit beam. Thus, for each transmit beam, the base station 105 may identify a subset of receive beams that are suitable for performing an LBT procedure for transmissions using the transmit beam.

If a single transmit beam is to be used for transmissions in a TxOP, the set of receive beams corresponding to all transmit beams may be the same as the subset of receive beams suitable for performing an LBT procedure for transmissions using the single transmit beam (i.e., a fully connected closed set $X(\theta, \phi)$). If multiple transmit beams 315 are to be used for transmissions in a TxOP 310 (as shown in FIG. 3), subsets of receive beams (i.e., a multiple disjoint closed sets $X(\theta, \phi)$) suitable for performing LBT procedures for transmissions using each of the transmit beams may be combined or unionized to form the set of receive beams corresponding to all of the transmit beams 315. Once the base station 105 identifies the set of receive beams corresponding to all of the transmit beams 315, the base station 105 may select a receive beam from the set for performing the LBT procedure 305.

As described above, in this example, the base station 105 may select the receive beam for performing the LBT procedure 305 based on the energy of each of the transmit beams 315 to be used for transmissions in the TxOP 310. In particular, if the base station 105 determines that the energy of each of the transmit beams integrated over the direction of a receive beam is greater than the total energy of the transmit beam integrated over all directions (e.g., the receive beam corresponds to, contains, or covers each of the transmit beams), the base station 105 may select the receive beam for performing the LBT procedure 305. Thus, if the LBT procedure 305 is performed using a receive beam with a receive beam pattern of $A_r(\theta, \phi)$, any transmit beam that satisfies the following condition can be used for transmissions in the TxOP 310: $\int A_t(\theta, \phi) d\theta d\phi \geq \beta E_t$, where the integration is performed over the angles or direction of the receive beam (i.e., $\theta$ and $\phi$), $\beta$ captures a threshold value (e.g., 0.95), and $E_t$ is the total energy of the transmit beam integrated over all directions. That is, if the LBT procedure 305 is performed using a receive beam, any transmit beam which transmits a significant fraction of energy in the direction of the receive beam may be used by the base station 105 as a valid transmit beam.

Using these techniques for selecting a receive beam for an LBT procedure based on the energy of each transmit beam to be used for transmissions in a TxOP, a wireless device may be able to select a receive beam that corresponds to, covers, or contains a transmit beam. Such a hierarchical structure of beams may allow a base station to perform an LBT procedure using a receive beam X for transmissions using transmit beams Y and Z or an LBT procedure using a receive beam Y for a transmission on transmit beam Z (e.g., if beam Y is contained within beam X and beam Z is contained within beam Y). In some cases, depending on the definition of the threshold value $\beta$ described above, the codebook design that facilitates these techniques may be inflexible or may not be optimized for transmissions because wireless devices may have to support beams whose energies integrated over other beams directions are within a threshold of the total energy of the beams (e.g., beams which are contained within other beams).

In another example, the base station 105 may select a receive beam for performing an LBT procedure 305 if the receive beam is quasi co-located with each of the transmit beams 315 to be used in a TxOP 310 (e.g., the receive beam corresponds to, contains, or covers each of the transmit beams 315). That is, the base station 105 may select a receive beam for performing an LBT procedure 305 if a relationship between the receive beam and each of the transmit beams is in accordance with one or more QCL types, which in some cases may be predefined or otherwise agreed upon across devices within a wireless communications system (e.g., QCL type D). Thus, if base station 105 uses a beam X to transmit a reference signal A (e.g., an SSB, channel state information reference signal (CSI-RS), or tracking reference signal (TRS)) to a UE, and the base station 105 uses a receive beam that is quasi co-located with beam X to perform an LBT procedure for TxOP 310, any reference signals (and associated physical channel) which derives its QCL properties (e.g., QCL type D) from beam X may be transmitted in the TxOP 310.

Using these techniques for selecting a receive beam for an LBT procedure based on the receive beam being quasi co-located with each of the transmit beams to be used in a TxOP, a wireless device may be able to select a receive beam that corresponds to, covers, or contains a transmit beam. Such a hierarchical structure of beams may allow a base station 105 to perform an LBT procedure using a receive beam X for transmissions using transmit beams Y, Z, or both or an LBT procedure using a receive beam Y for a transmission on transmit beam Z (e.g., if beam Y is quasi co-located or derives its QCL properties from beam X and beam Z is quasi co-located or derives its QCL properties from beam Y). Further, the codebook design that facilitates these techniques may not be constrained because a wireless communications system or base station 105 may define which beams are quasi co-located.

In some cases, however, it may be challenging to identify a receive beam that is quasi co-located with all transmit beams to be used for transmissions in a TxOP (e.g., a receive beam that is quasi co-located with beams used for transmitting different SSBs). Further, beams that are said to be quasi co-located are generally quasi co-located for communications with a specific UE 115. Thus, if a base station 105 is scheduled to transmit to multiple UEs 115 on multiple transmit beams in a TxOP, it may be challenging to identify a receive beam that is quasi co-located with all the transmit beams. Accordingly, in some instances, the techniques described herein may be combined. For instance, if a base station 105 is scheduled to transmit multiple SSBs in a TxOP, the base station 105 may determine to select the receive beam for performing an LBT procedure in an attempt to gain access to the TxOP based on the energy of each of the transmit beams to be used for transmissions in the TxOP. Otherwise, the base station 105 may select a receive beam for the LBT procedure based on the receive beam being quasi co-located with each of the transmit beams to be used in a TxOP.

Using the techniques described above, a base station 105 (or any wireless device) may be able to identify a suitable receive beam for performing an LBT procedure in an attempt to gain access to a TxOP, where the receive beam may correspond to all transmit beams to be used for transmissions in the TxOP. In some cases, however, the base station 105 may also be configured to select a receive beam for performing an LBT procedure in an attempt to gain access to a TxOP if the receive beam corresponds to the transmit beams used for at least a fraction or percentage of the transmissions in the TxOP (e.g., applicable to both energy based and QCL derivative based schemes).

For instance, if a threshold percentage of 95% is defined, the base station 105 may select a receive beam for performing an LBT procedure in an attempt to gain access to a TxOP if the receive beam corresponds to transmit beams used for at least 95% of the transmissions or transmit beams used in at least 95% of the symbols in a TxOP allocated for transmissions from the base station 105 (e.g., if 200 symbols in a TxOP are allocated for transmissions from the base station 105, 10 symbols may be transmitted using transmit beams that fail to correspond to the receive beam used for an LBT procedure). Thus, for a long TxOP, where a base station 105 may not be able to determine all the transmit beams to be used for transmissions in the TxOP, the base station 105 may still be able to identify a receive beam for performing an LBT procedure in an attempt to gain access to the TxOP (e.g., if the transmit beams that the base station 105 is able to identify is used for at least the threshold percentage of transmissions in the TxOP).

Figure 4:
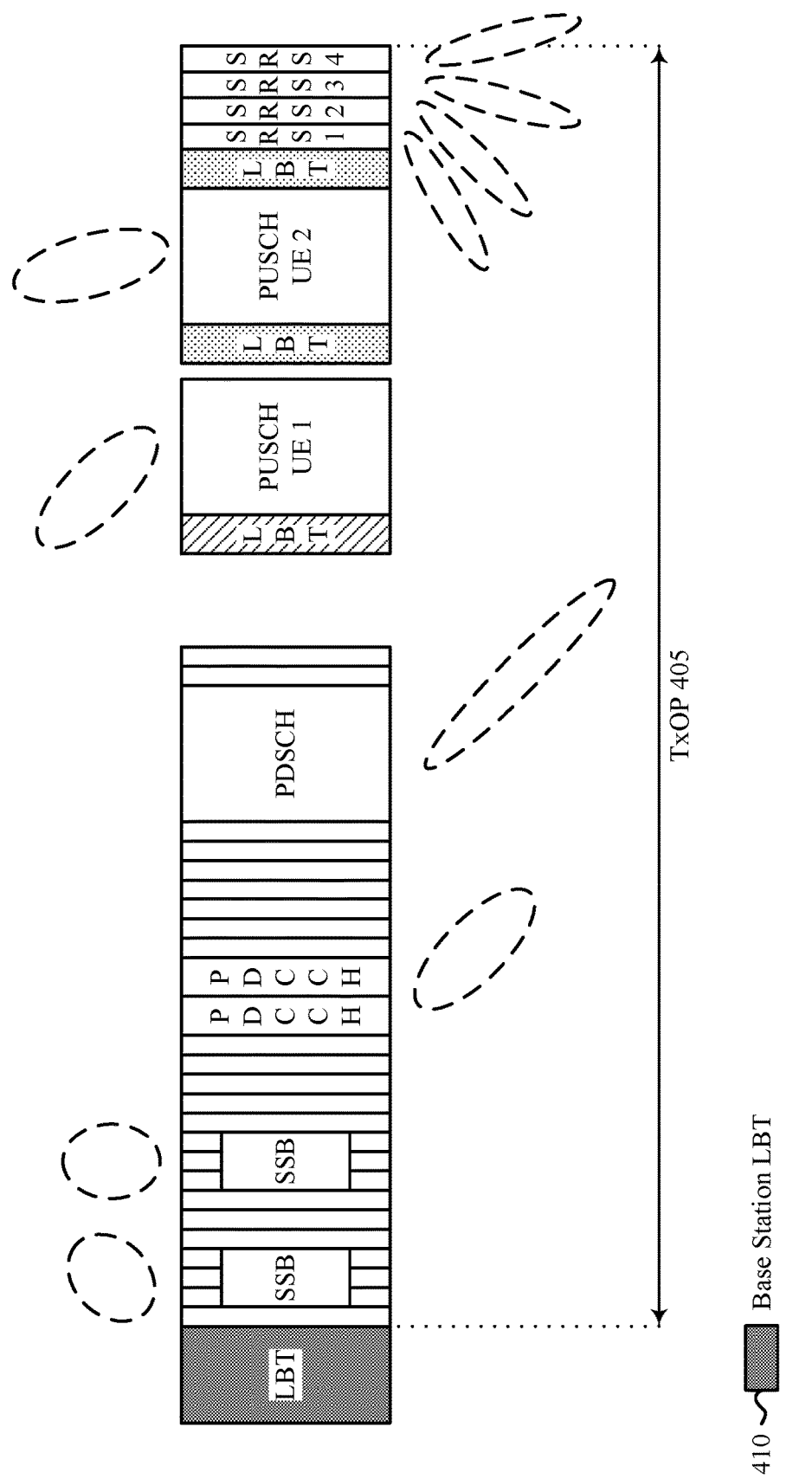

FIG. 4 illustrates another example of a timeline 400 of communications in a shared radio frequency spectrum in accordance with aspects of the present disclosure. In the example of FIG. 4, a base station 105 may be scheduled for transmissions (e.g., SSBs, a PDCCH, and a PDSCH) using multiple beams in the shared radio frequency spectrum. In addition, a first UE 115 may be scheduled for a transmission (e.g., a PUSCH) using a single beam in the shared radio frequency spectrum, and a second UE 115 may be scheduled for transmissions (e.g., a PUSCH and sounding reference signals (SRSs)) in the shared radio frequency spectrum. Accordingly, the base station 105, first UE 115, and second UE 115 may use the techniques described above with reference to FIG. 3 to identify suitable beams for performing the LBT procedure 410, the LBT procedure 415, and the LBT procedures 420 in an attempt to gain access to the TxOP 405 for the scheduled transmissions. Thus, it can be understood from FIG. 4, that the techniques described herein may be performed by various wireless devices (e.g., base stations 105 and UEs 115) and may be applicable in different scenarios.

Figure 5:
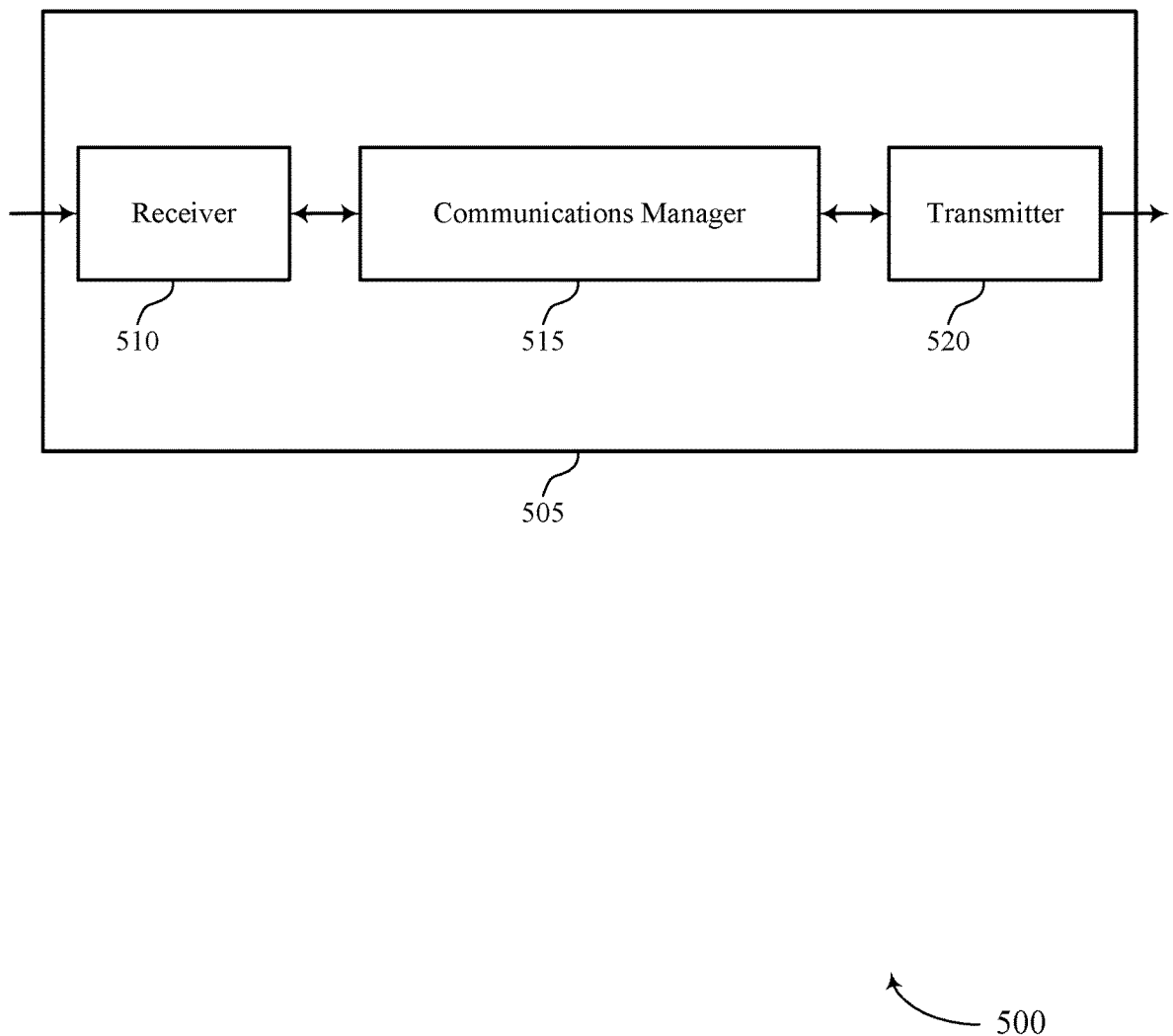
FIGS. 5 and 6 show block diagrams of devices that support beam definition for directional communications in accordance with aspects of the present disclosure.

FIG. 5 shows a block diagram 500 of a device 505 that supports beam definition for directional communications in accordance with aspects of the present disclosure. The device 505 may be an example of aspects of a UE 115 or base station 105 as described herein. The device 505 may include a receiver 510, a communications manager 515, and a transmitter 520. The device 505 may also include a processor. Each of these components may be in communication with one another (e.g., via one or more buses).

Receiver 510 may receive information such as packets, user data, or control information associated with various information channels (e.g., control channels, data channels, and information related to beam definition for directional communications, etc.). Information may be passed on to other components of the device 505. The receiver 510 may be an example of aspects of the transceiver 820 or 920 as described with reference to FIGS. 8 and 9. The receiver 510 may utilize a single antenna or a set of antennas.

The communications manager 515 may identify one or more transmit beams to be used for transmissions in a transmission opportunity of a shared radio frequency spectrum, select a receive beam corresponding to the one or more transmit beams for performing a listen before talk procedure in an attempt to gain access to the transmission opportunity for the transmissions, and perform the listen before talk procedure using the selected receive beam. The communications manager 515 may be an example of aspects of the communications manager 810 or 910 as described herein.

The actions performed by the communications manager 515 as described herein may be implemented to realize one or more potential advantages. One implementation may allow a UE 115 to save power and increase battery life by avoiding having to perform inefficient cell access procedures when operating in an unlicensed high frequency band. Additionally or alternatively, another implementation may provide improved quality and reliability of service at the UE 115, as the contention based cell access procedures may follow a hierarchical structure, such that a base station 105 may perform LBT on a first beam to transmit or receive on a different beam.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 520 may transmit signals generated by other components of the device 505. In some examples, the transmitter 520 may be collocated with a receiver 510 in a transceiver module. For example, the transmitter 520 may be an example of aspects of the transceiver 820 or 920 as described with reference to FIGS. 8 and 9. The transmitter 520 may utilize a single antenna or a set of antennas.

Figure 6:
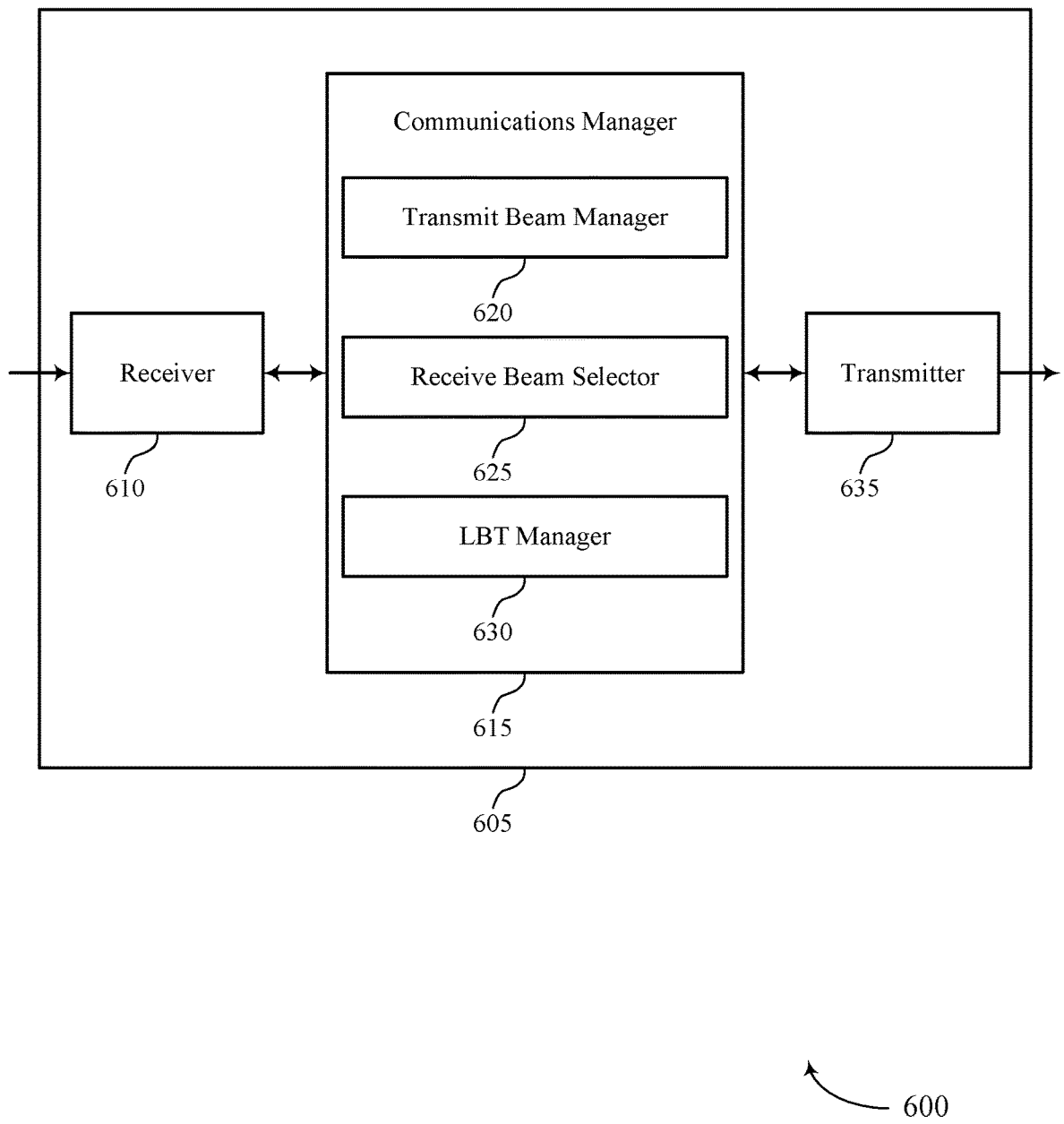

FIG. 6 shows a block diagram 600 of a device 605 that supports beam definition for directional communications in accordance with aspects of the present disclosure. The device 605 may be an example of aspects of a device 505, a UE 115, or a base station 105 as described herein. The device 605 may include a receiver 610, a communications manager 615, and a transmitter 635. The device 605 may also include a processor. Each of these components may be in communication with one another (e.g., via one or more buses).

Receiver 610 may receive information such as packets, user data, or control information associated with various information channels (e.g., control channels, data channels, and information related to beam definition for directional communications, etc.). Information may be passed on to other components of the device 605. The receiver 610 may be an example of aspects of the transceiver 820 or 920 as described with reference to FIGS. 8 and 9. The receiver 610 may utilize a single antenna or a set of antennas.

The communications manager 615 may be an example of aspects of the communications manager 515 as described herein. The communications manager 615 may include a transmit beam manager 620, a receive beam selector 625, and an LBT manager 630. The communications manager 615 may be an example of aspects of the communications manager 810 or 910 as described herein.

The transmit beam manager 620 may identify one or more transmit beams to be used for transmissions in a transmission opportunity of a shared radio frequency spectrum. The receive beam selector 625 may select a receive beam corresponding to the one or more transmit beams for performing a listen before talk procedure in an attempt to gain access to the transmission opportunity for the transmissions. The LBT manager 630 may perform the listen before talk procedure using the selected receive beam.

Transmitter 635 may transmit signals generated by other components of the device 605. In some examples, the transmitter 635 may be collocated with a receiver 610 in a transceiver module. For example, the transmitter 635 may be an example of aspects of the transceiver 820 or 920 as described with reference to FIGS. 8 and 9. The transmitter 635 may utilize a single antenna or a set of antennas.

Figure 7:
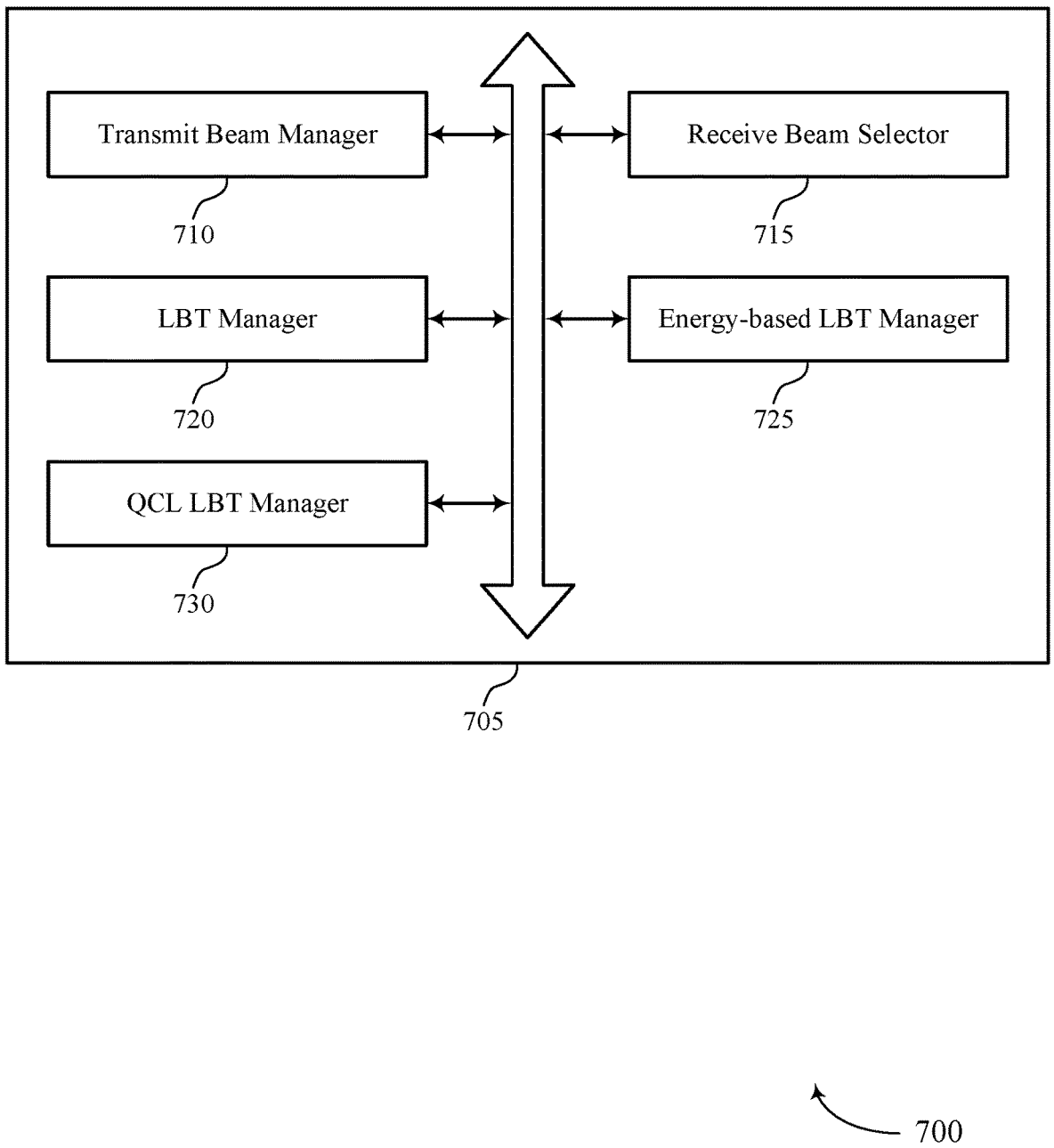
FIG. 7 shows a block diagram of a communications manager that supports beam definition for directional communications in accordance with aspects of the present disclosure.

FIG. 7 shows a block diagram 700 of a communications manager 705 that supports beam definition for directional communications in accordance with aspects of the present disclosure. The communications manager 705 may be an example of aspects of a communications manager 515, a communications manager 615, or a communications manager 810 described herein. The communications manager 705 may include a transmit beam manager 710, a receive beam selector 715, an LBT manager 720, an energy-based LBT manager 725, and a QCL LBT manager 730. Each of these modules may communicate, directly or indirectly, with one another (e.g., via one or more buses).

The transmit beam manager 710 may identify one or more transmit beams to be used for transmissions in a transmission opportunity of a shared radio frequency spectrum. In some examples, the transmit beam manager 710 may identify the one or more transmit beams to be used for at least a fraction of transmissions in the transmission opportunity of the shared radio frequency spectrum. In some cases, the at least the fraction of the transmissions in the transmission opportunity corresponds to at least a fraction of a number of symbols in the transmission opportunity. In some cases, the transmissions include reference signal transmissions, control information transmissions, data transmissions, or a combination thereof.

The receive beam selector 715 may select a receive beam corresponding to the one or more transmit beams for performing a listen before talk procedure in an attempt to gain access to the transmission opportunity for the transmissions. In some examples, the receive beam selector 715 may select the receive beam from the set of receive beams based on the determination. In some examples, the receive beam selector 715 may select the receive beam for performing the listen before talk procedure based on the determining. In some examples, the receive beam selector 715 may determine that the receive beam is a widest beam corresponding to the one or more transmit beams, where selecting the receive beam is based on the receive beam being the widest beam corresponding to the one or more transmit beams.

The LBT manager 720 may perform the listen before talk procedure using the selected receive beam. In some examples, the LBT manager 720 may refrain from performing a listen before talk procedure for transmissions in a remainder of the transmission opportunity or may perform a one-shot listen before talk procedure for transmissions in the remainder of the transmission opportunity.

The energy-based LBT manager 725 may determine an energy of each of the one or more transmit beams, where selecting the receive beam is based on the energy of each of the one or more transmit beams. In some examples, the energy-based LBT manager 725 may determine a maximum gain for receiving a transmission on each of the one or more transmit beams. In some examples, identifying subsets of receive beams each corresponding to one of the one or more transmit beams, where the subset of receive beams corresponding to a transmit beam includes receive beams each having a gain that is within a threshold of the maximum gain for receiving a transmission on the transmit beam. In some examples, the energy-based LBT manager 725 may identify a set of receive beams available for performing the listen before talk procedure as a union of the subsets of receive beams.

In some examples, the energy-based LBT manager 725 may determine that the energy of each of the one or more transmit beams integrated over the angle of the receive beam is greater than a fraction of a total energy of each of the one or more transmit beams integrated over all directions. In some cases, the threshold includes an attenuation factor. In some cases, the fraction of the total energy is calculated by multiplying a threshold value by the total energy of each of the one or more transmit beams integrated over all directions. The QCL LBT manager 730 may determine that the receive beam is quasi co-located with each of the one or more transmit beams. In some examples, the QCL LBT manager 730 may identify a target QCL type. In some examples, the QCL LBT manager 730 may determine that a relationship between the receive beam and each of the one or more transmit beams is in accordance with the target QCL type.

Figure 8:
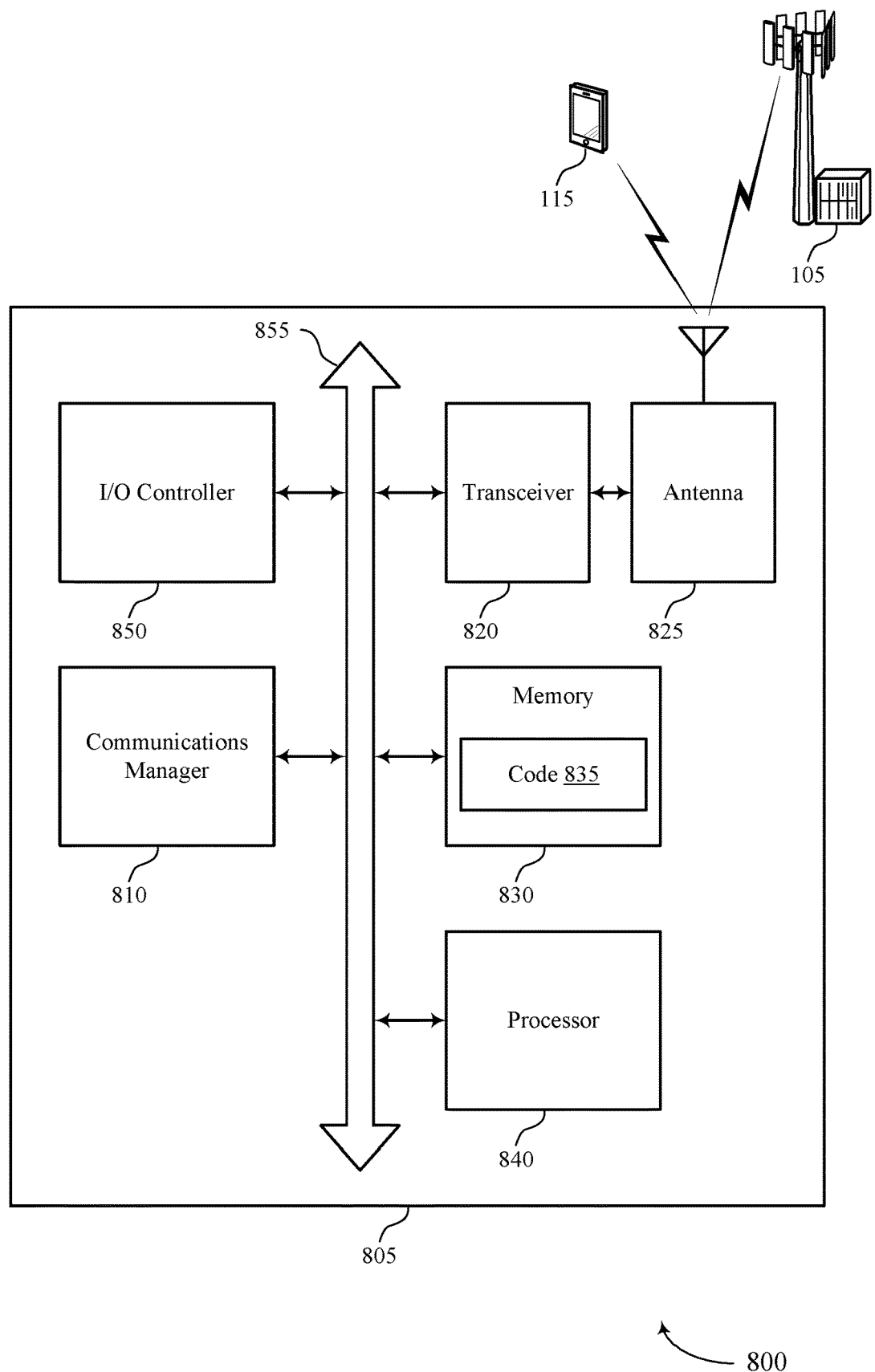
FIG. 8 shows a diagram of a system including a user equipment (UE) that supports beam definition for directional communications in accordance with aspects of the present disclosure.

FIG. 8 shows a diagram of a system 800 including a device 805 that supports beam definition for directional communications in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, a transceiver 820, an antenna 825, memory 830, a processor 840, and an I/O controller 850. These components may be in electronic communication via one or more buses (e.g., bus 855).

The communications manager 810 may identify one or more transmit beams to be used for transmissions in a transmission opportunity of a shared radio frequency spectrum, select a receive beam corresponding to the one or more transmit beams for performing a listen before talk procedure in an attempt to gain access to the transmission opportunity for the transmissions, and perform the listen before talk procedure using the selected receive beam.

Transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM, ROM, or a combination thereof. The memory 830 may store computer-readable code 835 including instructions that, when executed by a processor (e.g., the processor 840) cause the device to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting beam definition for directional communications).

The I/O controller 850 may manage input and output signals for the device 805. The I/O controller 850 may also manage peripherals not integrated into the device 805. In some cases, the I/O controller 850 may represent a physical connection or port to an external peripheral. In some cases, the I/O controller 850 may utilize an operating system such as iOS®, ANDROID®, MS-DOS®, MS-WINDOWS®, OS/2®, UNIX®, LINUX®, or another known operating system. In other cases, the I/O controller 850 may represent or interact with a modem, a keyboard, a mouse, a touchscreen, or a similar device. In some cases, the I/O controller 850 may be implemented as part of a processor. In some cases, a user may interact with the device 805 via the I/O controller 850 or via hardware components controlled by the I/O controller 850.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
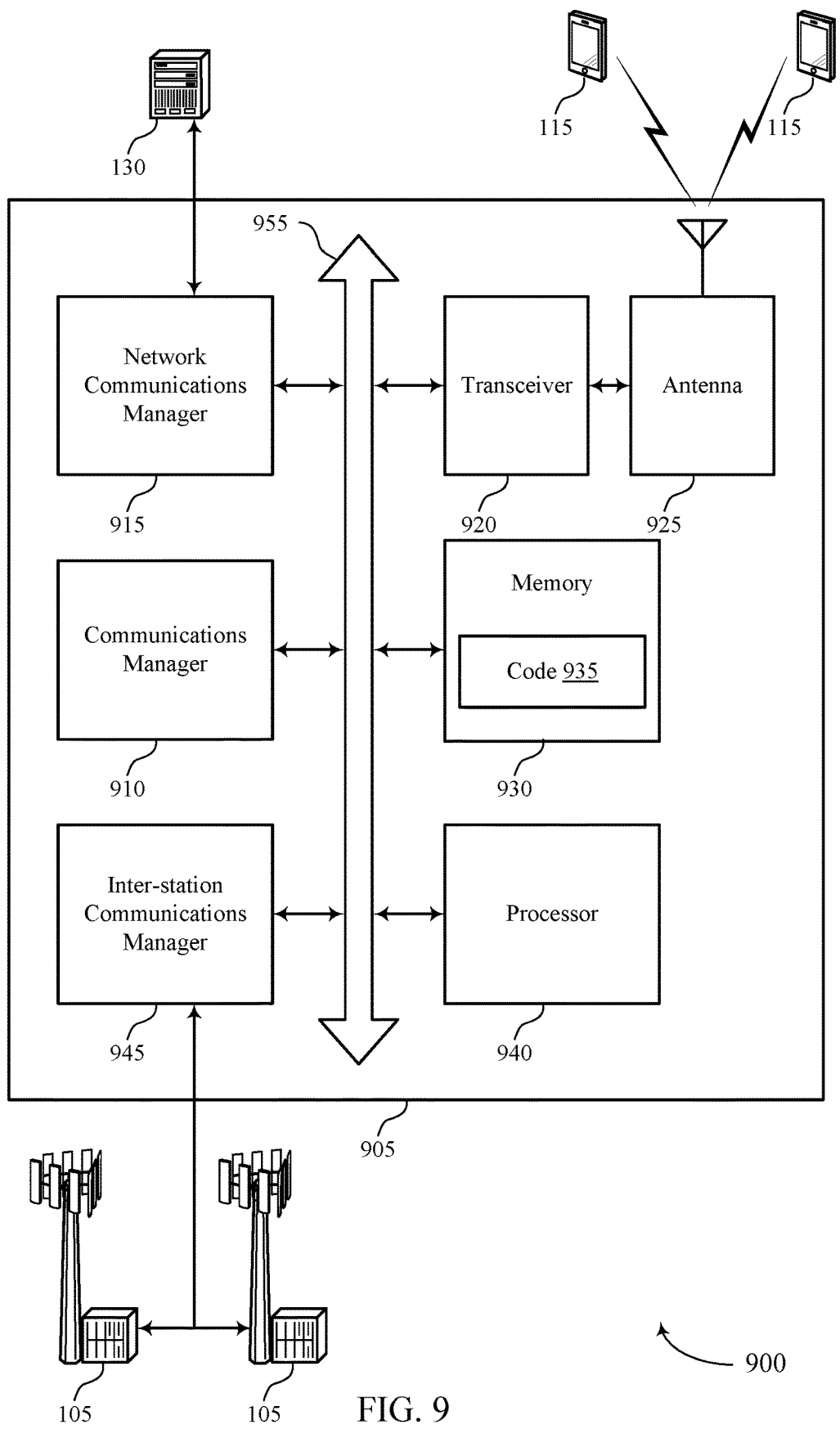
FIG. 9 shows a diagram of a system including a base station that supports beam definition for directional communications in accordance with aspects of the present disclosure.

FIG. 9 shows a diagram of a system 900 including a device 905 that supports beam definition for directional communications in accordance with aspects of the present disclosure. The device 905 may be an example of or include the components of device 505, device 605, or a base station 105 as described herein. The device 905 may include components for bi-directional voice and data communications including components for transmitting and receiving communications, including a communications manager 910, a network communications manager 915, a transceiver 920, an antenna 925, memory 930, a processor 940, and an inter-station communications manager 945. These components may be in electronic communication via one or more buses (e.g., bus 955).

The communications manager 910 may identify one or more transmit beams to be used for transmissions in a transmission opportunity of a shared radio frequency spectrum, select a receive beam corresponding to the one or more transmit beams for performing a listen before talk procedure in an attempt to gain access to the transmission opportunity for the transmissions, and perform the listen before talk procedure using the selected receive beam.

Network communications manager 915 may manage communications with the core network (e.g., via one or more wired backhaul links). For example, the network communications manager 915 may manage the transfer of data communications for client devices, such as one or more UEs 115.

Transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM, ROM, or a combination thereof. The memory 930 may store computer-readable code 935 including instructions that, when executed by a processor (e.g., the processor 940) cause the device to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting beam definition for directional communications).

Inter-station communications manager 945 may manage communications with other base station 105 and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, inter-station communications manager 945 may provide an X2 interface within an LTE/LTE-A wireless communication network technology to provide communication between base stations 105.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
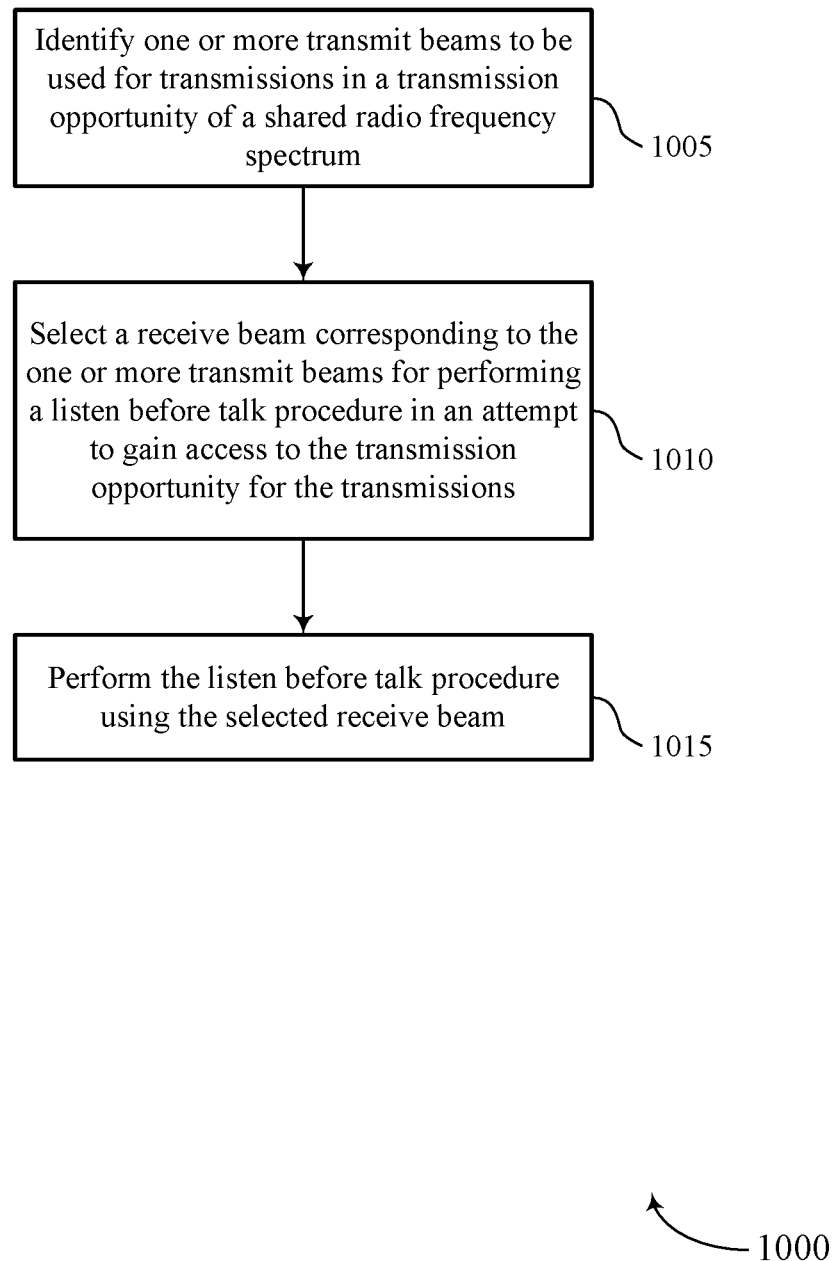
FIGS. 10 through 12 show flowcharts illustrating methods that support beam definition for directional communications in accordance with aspects of the present disclosure.

FIG. 10 shows a flowchart illustrating a method 1000 that supports beam definition for directional communications in accordance with aspects of the present disclosure. The operations of method 1000 may be implemented by a UE 115 or base station 105 or its components as described herein. For example, the operations of method 1000 may be performed by a communications manager as described with reference to FIGS. 5 through 9. In some examples, a UE or base station may execute a set of instructions to control the functional elements of the UE or base station to perform the functions described below. Additionally, or alternatively, a UE or base station may perform aspects of the functions described below using special-purpose hardware.

At 1005, the UE or base station may identify one or more transmit beams to be used for transmissions in a transmission opportunity of a shared radio frequency spectrum. The operations of 1005 may be performed according to the methods described herein. In some examples, aspects of the operations of 1005 may be performed by a transmit beam manager as described with reference to FIGS. 5 through 9.

At 1010, the UE or base station may select a receive beam corresponding to the one or more transmit beams for performing a listen before talk procedure in an attempt to gain access to the transmission opportunity for the transmissions. The operations of 1010 may be performed according to the methods described herein. In some examples, aspects of the operations of 1010 may be performed by a receive beam selector as described with reference to FIGS. 5 through 9.

At 1015, the UE or base station may perform the listen before talk procedure using the selected receive beam. The operations of 1015 may be performed according to the methods described herein. In some examples, aspects of the operations of 1015 may be performed by an LBT manager as described with reference to FIGS. 5 through 9.

Figure 11:
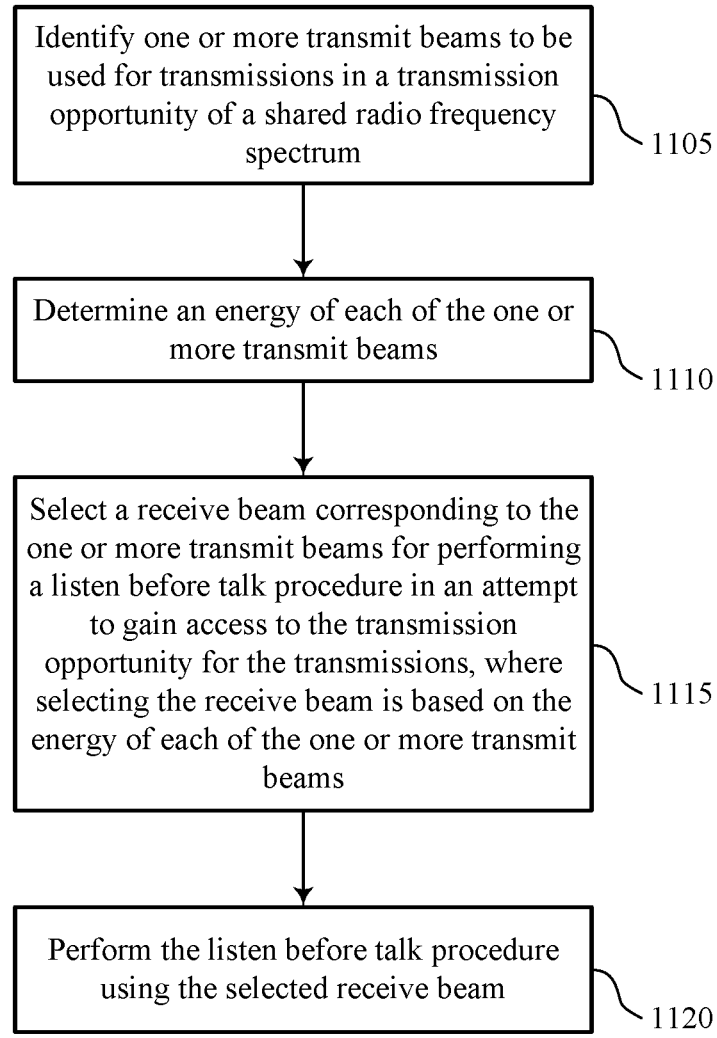

FIG. 11 shows a flowchart illustrating a method 1100 that supports beam definition for directional communications in accordance with aspects of the present disclosure. The operations of method 1100 may be implemented by a UE 115 or base station 105 or its components as described herein. For example, the operations of method 1100 may be performed by a communications manager as described with reference to FIGS. 5 through 9. In some examples, a UE or base station may execute a set of instructions to control the functional elements of the UE or base station to perform the functions described below. Additionally, or alternatively, a UE or base station may perform aspects of the functions described below using special-purpose hardware.

At 1105, the UE or base station may identify one or more transmit beams to be used for transmissions in a transmission opportunity of a shared radio frequency spectrum. The operations of 1105 may be performed according to the methods described herein. In some examples, aspects of the operations of 1105 may be performed by a transmit beam manager as described with reference to FIGS. 5 through 9.

At 1110, the UE or base station may determine an energy of each of the one or more transmit beams. The operations of 1110 may be performed according to the methods described herein. In some examples, aspects of the operations of 1110 may be performed by an energy-based LBT manager as described with reference to FIGS. 5 through 9.

At 1115, the UE or base station may select a receive beam corresponding to the one or more transmit beams for performing a listen before talk procedure in an attempt to gain access to the transmission opportunity for the transmissions, where selecting the receive beam is based on the energy of each of the one or more transmit beams. The operations of 1115 may be performed according to the methods described herein. In some examples, aspects of the operations of 1115 may be performed by a receive beam selector as described with reference to FIGS. 5 through 9.

At 1120, the UE or base station may perform the listen before talk procedure using the selected receive beam. The operations of 1120 may be performed according to the methods described herein. In some examples, aspects of the operations of 1120 may be performed by an LBT manager as described with reference to FIGS. 5 through 9.

Figure 12:
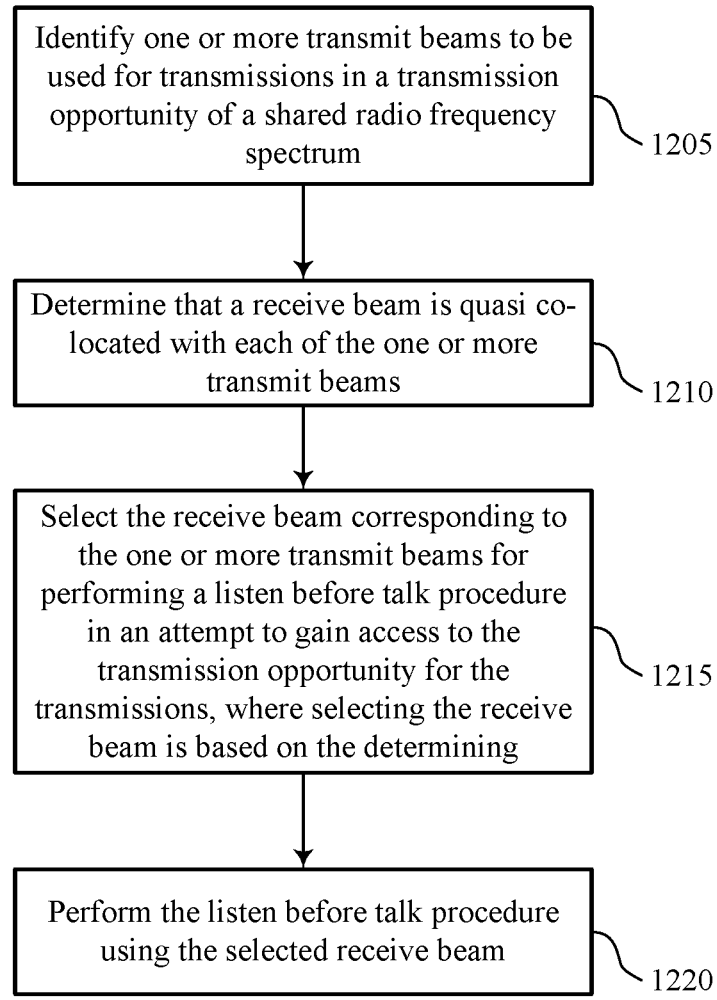

FIG. 12 shows a flowchart illustrating a method 1200 that supports beam definition for directional communications in accordance with aspects of the present disclosure. The operations of method 1200 may be implemented by a UE 115 or base station 105 or its components as described herein. For example, the operations of method 1200 may be performed by a communications manager as described with reference to FIGS. 5 through 9. In some examples, a UE or base station may execute a set of instructions to control the functional elements of the UE or base station to perform the functions described below. Additionally, or alternatively, a UE or base station may perform aspects of the functions described below using special-purpose hardware.

At 1205, the UE or base station may identify one or more transmit beams to be used for transmissions in a transmission opportunity of a shared radio frequency spectrum. The operations of 1205 may be performed according to the methods described herein. In some examples, aspects of the operations of 1205 may be performed by a transmit beam manager as described with reference to FIGS. 5 through 9.

At 1210, the UE or base station may determine that the receive beam is quasi co-located with each of the one or more transmit beams. The operations of 1210 may be performed according to the methods described herein. In some examples, aspects of the operations of 1210 may be performed by a QCL LBT manager as described with reference to FIGS. 5 through 9.

At 1215, the UE or base station may select a receive beam corresponding to the one or more transmit beams for performing a listen before talk procedure in an attempt to gain access to the transmission opportunity for the transmissions, where selecting the receive beam is based on the determining. The operations of 1215 may be performed according to the methods described herein. In some examples, aspects of the operations of 1215 may be performed by a receive beam selector as described with reference to FIGS. 5 through 9.

At 1220, the UE or base station may perform the listen before talk procedure using the selected receive beam. The operations of 1220 may be performed according to the methods described herein. In some examples, aspects of the operations of 1220 may be performed by an LBT manager as described with reference to FIGS. 5 through 9.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a wireless device, comprising:
   identifying one or more transmit beams to be used by the wireless device to transmit during a transmission opportunity of a shared radio frequency spectrum;
   determining an energy of each of the one or more transmit beams to be used by the wireless device;
   selecting a receive beam corresponding to the one or more transmit beams based at least in part on comparing a threshold to the energy of each of the one or more transmit beams over an angle of the receive beam; and
   using the selected receive beam to receive one or more signals during a listen before talk procedure for gaining access to the transmission opportunity.

2. The method of claim 1, further comprising:
   determining that the receive beam is a widest beam corresponding to the one or more transmit beams, wherein selecting the receive beam is based at least in part on the receive beam being the widest beam corresponding to the one or more transmit beams.

3. The method of claim 1, further comprising:
   determining a maximum gain for receiving a transmission on each of the one or more transmit beams;
   identifying subsets of receive beams each corresponding to one of the one or more transmit beams, wherein the subset of receive beams corresponding to a transmit beam comprises receive beams each having a gain that is within a second threshold of the maximum gain for receiving a transmission on the transmit beam; and
   identifying a set of receive beams available for performing the listen before talk procedure as a union of the subsets of receive beams.

4. The method of claim 3, wherein the second threshold comprises an attenuation factor.

5. The method of claim 3, wherein selecting the receive beam comprises:
   determining that the energy of each of the one or more transmit beams integrated over the angle of the receive beam is greater than the threshold, the threshold comprising a fraction of a total energy of each of the one or more transmit beams integrated over all directions; and
   selecting the receive beam from the set of receive beams based at least in part on the determination.

6. The method of claim 5, wherein the fraction of the total energy is calculated by multiplying a third threshold value by the total energy of each of the one or more transmit beams integrated over all directions.

7. The method of claim 1, wherein selecting the receive beam comprises:
   determining that the receive beam is quasi co-located with each of the one or more transmit beams; and
   selecting the receive beam for performing the listen before talk procedure based at least in part on the determining.

8. The method of claim 1, wherein identifying the one or more transmit beams to be used for transmissions in the transmission opportunity comprises:
   identifying the one or more transmit beams to be used for at least a fraction of transmissions in the transmission opportunity of the shared radio frequency spectrum.

9. The method of claim 8, wherein the at least the fraction of the transmissions in the transmission opportunity corresponds to at least a fraction of a number of symbols in the transmission opportunity.

10. The method of claim 8, further comprising:
    refraining from performing a listen before talk procedure for transmissions in a remainder of the transmission opportunity; or; and
    performing a one-shot listen before talk procedure for transmissions in the remainder of the transmission opportunity.

11. The method of claim 1, wherein the transmissions comprise reference signal transmissions, control information transmissions, data transmissions, or a combination thereof.

12. An apparatus for wireless communication at a wireless device, comprising:
a processor;
memory in electronic communication with the processor; and
instructions stored in the memory and executable by the processor to cause the apparatus to:
identify one or more transmit beams to be used by the wireless device to transmit during a transmission opportunity of a shared radio frequency spectrum;
determine an energy of each of the one or more transmit beams to be used by the wireless device;
select a receive beam corresponding to the one or more transmit beams based at least in part on comparing a threshold to the energy of each of the one or more transmit beams over an angle of the receive beam; and
use the selected receive beam to receive one or more signals during a listen before talk procedure for gaining access to the transmission opportunity.

13. The apparatus of claim 12, wherein the instructions are further executable by the processor to cause the apparatus to:
determine that the receive beam is a widest beam corresponding to the one or more transmit beams, wherein selecting the receive beam is based at least in part on the receive beam being the widest beam corresponding to the one or more transmit beams.

14. The apparatus of claim 12, wherein the instructions are further executable by the processor to cause the apparatus to:
determine a maximum gain for receiving a transmission on each of the one or more transmit beams;
identify subsets of receive beams each corresponding to one of the one or more transmit beams, wherein the subset of receive beams corresponding to a transmit beam comprises receive beams each having a gain that is within a second threshold of the maximum gain for receiving a transmission on the transmit beam; and
identify a set of receive beams available for performing the listen before talk procedure as a union of the subsets of receive beams.

15. The apparatus of claim 14, wherein the second threshold comprises an attenuation factor.

16. The apparatus of claim 14, wherein the instructions to select the receive beam are executable by the processor to cause the apparatus to:
determine that the energy of each of the one or more transmit beams integrated over the angle of the receive beam is greater than the threshold, the threshold comprising a fraction of a total energy of each of the one or more transmit beams integrated over all directions; and
select the receive beam from the set of receive beams based at least in part on the determination.

17. The apparatus of claim 16, wherein the fraction of the total energy is calculated by multiplying a third threshold value by the total energy of each of the one or more transmit beams integrated over all directions.

18. The apparatus of claim 12, wherein the instructions to select the receive beam are executable by the processor to cause the apparatus to:
determine that the receive beam is quasi co-located with each of the one or more transmit beams; and
select the receive beam for performing the listen before talk procedure based at least in part on the determining.

19. The apparatus of claim 12, wherein the instructions to identify the one or more transmit beams to be used for transmissions in the transmission opportunity are executable by the processor to cause the apparatus to:
identify the one or more transmit beams to be used for at least a fraction of transmissions in the transmission opportunity of the shared radio frequency spectrum.

20. The apparatus of claim 19, wherein the at least the fraction of the transmissions in the transmission opportunity corresponds to at least a fraction of a number of symbols in the transmission opportunity.

21. The apparatus of claim 19, wherein the instructions are further executable by the processor to cause the apparatus to:
refrain from performing a listen before talk procedure for transmissions in a remainder of the transmission opportunity; or; and
perform a one-shot listen before talk procedure for transmissions in the remainder of the transmission opportunity.

22. The apparatus of claim 12, wherein the transmissions comprise reference signal transmissions, control information transmissions, data transmissions, or a combination thereof.

23. An apparatus for wireless communication at a wireless device, comprising:
means for identifying one or more transmit beams to be used by the wireless device to transmit during a transmission opportunity of a shared radio frequency spectrum;
means for determining an energy of each of the one or more transmit beams to be used by the wireless device;
means for selecting a receive beam corresponding to the one or more transmit beams based at least in part on comparing a threshold to the energy of each of the one or more transmit beams over an angle of the receive beam; and
means for using the selected receive beam to receive one or more signals during a listen before talk procedure for gaining access to the transmission opportunity.

24. The apparatus of claim 23, further comprising:
means for determining that the receive beam is a widest beam corresponding to the one or more transmit beams, wherein selecting the receive beam is based at least in part on the receive beam being the widest beam corresponding to the one or more transmit beams.

25. The apparatus of claim 23, further comprising:
means for determining a maximum gain for receiving a transmission on each of the one or more transmit beams;
means for identifying subsets of receive beams each corresponding to one of the one or more transmit beams, wherein the subset of receive beams corresponding to a transmit beam comprises receive beams each having a gain that is within a second threshold of the maximum gain for receiving a transmission on the transmit beam; and
means for identifying a set of receive beams available for performing the listen before talk procedure as a union of the subsets of receive beams.

26. The apparatus of claim 25, wherein the second threshold comprises an attenuation factor.

27. The apparatus of claim 25, wherein the means for selecting the receive beam comprises:

means for determining that the energy of each of the one or more transmit beams integrated over the angle of the receive beam is greater than the first threshold, the first threshold comprising a fraction of a total energy of each of the one or more transmit beams integrated over all directions; and means for selecting the receive beam from the set of receive beams based at least in part on the determination.

28. A method for wireless communication, comprising:

identifying one or more transmit beams to be used for transmissions in a transmission opportunity of a shared radio frequency spectrum;

selecting a receive beam corresponding to the one or more transmit beams for performing a listen before talk procedure in an attempt to gain access to the transmission opportunity for the transmissions, wherein selecting the receive beam comprises:
  identifying a target quasi-co-location (QCL) type;
  determining that a relationship between the receive beam and each of the one or more transmit beams is in accordance with the target QCL type; and
  selecting the receive beam for performing the listen before talk procedure based at least in part on the determining; and performing the listen before talk procedure using the selected receive beam.

29. An apparatus for wireless communication, comprising:

a processor;

memory in electronic communication with the processor; and instructions stored in the memory and executable by the processor to cause the apparatus to:
  identify one or more transmit beams to be used for transmissions in a transmission opportunity of a shared radio frequency spectrum;
  select a receive beam corresponding to the one or more transmit beams for performing a listen before talk procedure in an attempt to gain access to the transmission opportunity for the transmissions, wherein the instructions to select the receive beam are executable by the processor to cause the apparatus to:
    identify a target quasi-co-location (QCL) type;
    determine that a relationship between the receive beam and each of the one or more transmit beams is in accordance with the target QCL type; and
    select the receive beam for performing the listen before talk procedure based at least in part on the determining; and
  perform the listen before talk procedure using the selected receive beam.

* * * * *